April 23, 1968 P. SILVIO 3,379,340

STACKING TRAYS

Filed Oct. 21, 1965

INVENTOR
Paul Silvio

BY

ATTORNEY

United States Patent Office 3,379,340
Patented Apr. 23, 1968

3,379,340
STACKING TRAYS
Paul Silvio, 5201 S. Pleasant,
Kansas City, Mo. 64133
Filed Oct. 21, 1965, Ser. No. 499,457
4 Claims. (Cl. 220—97)

ABSTRACT OF THE DISCLOSURE

My invention consists of a circular, stackable tray having a number of stacking lugs, or spacers, by which a number of identical trays may be stacked, one upon the other, allowing a ventilated space between the bottoms of successive trays. The tray has an outwardly tapering circular side wall and a horizontal rim, in which a series of irregularly spaced ventilating parts are formed, the parts extending downward of the rim so as to also serve as stacking lugs.

This invention relates to stacking trays and has particular reference to such trays employed in the preparation of food.

In the preparation of various kinds of foods it is desirable either in the mixing stage, the cooking stage, or a storage stage between mixing and cooking to contain the food product in a tray. For economy of space, particularly essential in commercial preparation of food in volume, it is desirable to stack the trays one on another. In so doing it is essential to maintain a space between trays, to avoid damaging the surface of the food product, and in the case of certain foods, to maintain circulation of air. One specific example of this is in the commercial preparation of pizza, where it is advantageous to prepare the pizza dough in advance and store it until ordered by the customer, when the specific type of pizza may be selected from the stored doughs, inserted in the oven and baked. This expedites service to the customer by permitting all preparation except the baking to be completed in advance and the product stored. In the process it is essential to avoid the surface of the dough coming in contact with other trays or pans, because of its sticky tendency. Also, it is essential to maintain air circulation.

One object of my invention is to provide a tray adapted to be stacked one on another so as to solve the above problem.

Another object is to provide such a tray which is capable of being produced at low cost and by mass production methods.

A further object is to produce a tray which can be stacked on an identical tray, while retaining a given space between the two trays and permitting ventilation or air circulation between trays.

These and other objects of my invention will be apparent from the following specification and accompanying drawings in which similar numerals refer to similar parts throughout the views.

In the drawings, which are for illustrative purposes only:

Figure 1:
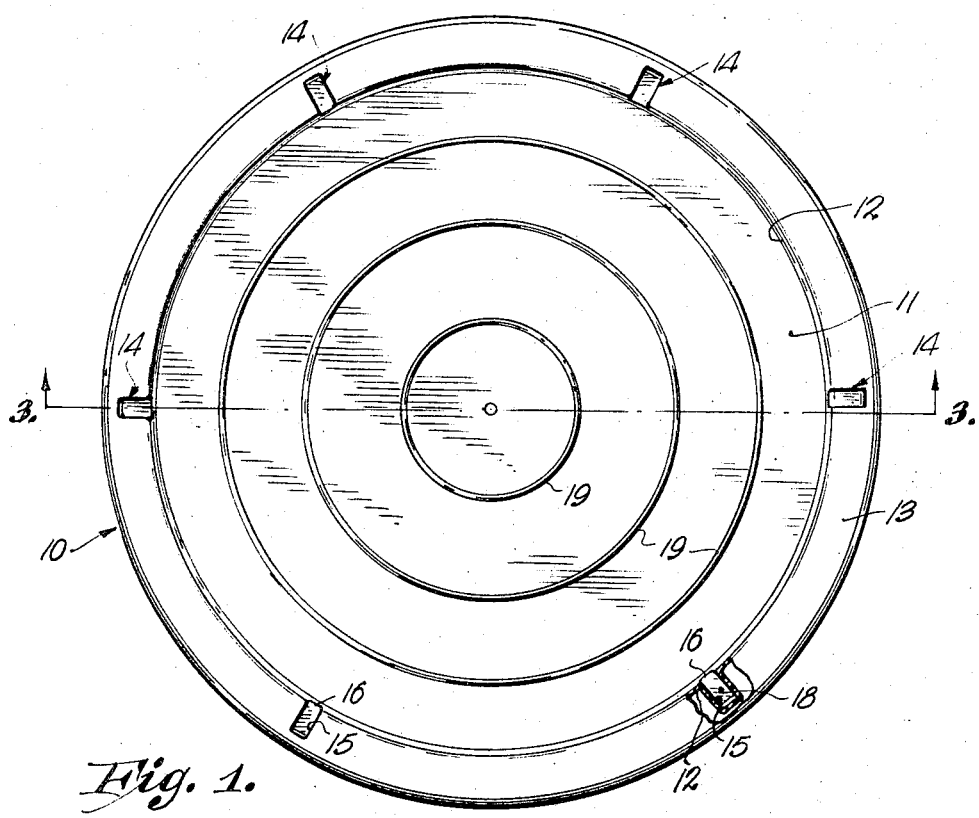
FIGURE 1 is a top plan view of one adaptation of my invention having a portion of the lip of the tray broken away to better illustrate the construction of the ventilating port.
Figure 2:
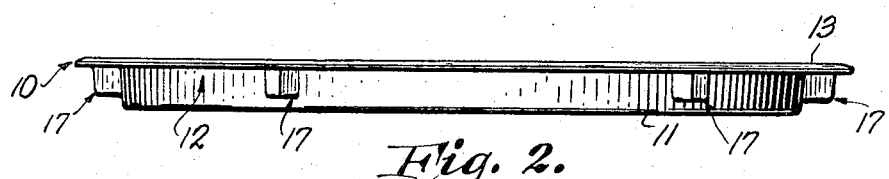
FIGURE 2 is a side view of the device.

Referring to the drawings, numeral 10 indicates a circular tray in accordance with my invention, formed from a single piece of plastic. Tray 10 has a flat bottom 11, a continuous side wall 12 extending upward from bottom 11 and an outwardly flaring lip 13 at the top of side wall 12. Side wall 12 slopes uniformly outward slightly as it extends upward to meet lip 13. A plurality of ventilating ports 14 are formed in lip 13 and wall 12 forming a continuous air space extending from opening 15 in lip 13 to opening 16 in side wall 12. Ports 14 extend downward a distance less than the full height of side wall 12 forming stacking lugs 17 having flat bottom 18.

Concentric ridges 19 are formed in tray bottom 11 to resist sliding of the dough when placed in the tray and the tray is moved about.

Stacking lugs 17 are irregularly spaced about the circumference of lip 13 so that as identical trays are stacked one above the other, it is less likely that the stacking lugs 17 of one tray will register and nest in the ventilating ports 14 of the tray below it.

The purpose of the outward slope of side wall 12 is to permit the bottom of a super-imposed identical tray to be partially inserted or stacked therein. Since the flat bottom 18 of stacking lug 17 is above the surface of tray bottom 11 a space will remain between the bottoms of successively stacked trays equal to the height of stacking lug 18. This space allows for the height of the flattened dough as well as further air space above the upward surface of the dough and below the bottom of the super-imposed upward pan.

Figure 3:
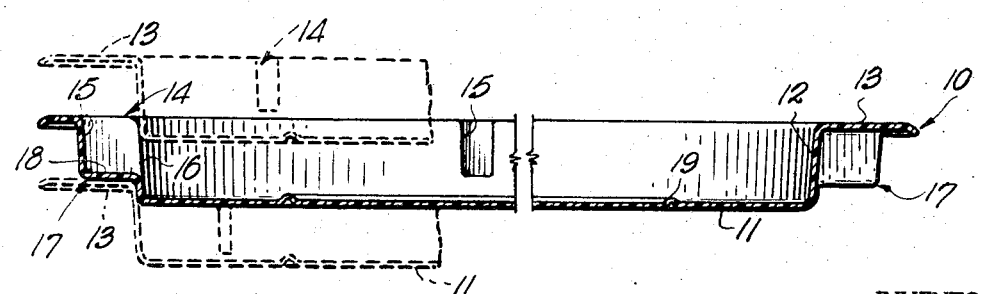
FIGURE 3 is an enlarged cross sectional view of the same tray taken along the line 3—3 of FIGURE 1 and showing identical trays stacked above and below the tray of FIGURE 1, by means of dotted lines.

As best shown in FIGURE 3, it will be seen that ports 14 permit access and circulation of outer air into the stacked trays through the passage formed from opening 15 to opening 16.

Since the side walls of vent ports 14 are parallel, the outer width of the bottom of spacer lug 18 is larger than the inner width of opening 15, further preventing meshing or nesting of identical stacked trays so as to retain the ventilating effect of ports 14.

Although ideally formed of a plastic material because of its inexpensiveness and ease of fabrication my device may also be formed of metal, crockery or other appropriate materials. In the preferred embodiment of my invention the tray is integrally formed of one single piece of material and, if formed of metal or plastic, is made from a single sheet through an extruding or stamping process.

While I have shown and described herein specific embodiments of my invention, it is to be understood that any change or changes in the forms of and in relative arrangements of components can be made within the scope of the invention, as defined by the claims appended hereto.

I claim:

1. A stacking tray comprising a circular flat tray bottom, a continuous side wall extending upward from said bottom, a horizontal lip extending outward from the upper edge of said side wall, a plurality of depressed combined air vent and stacking lugs formed in said lip and extending downward therefrom to the inner surface of said side wall; each of said ports extending outward of said side wall so as to form a stacking lug underneath said lip, said ports being irregularly spaced about said lip.

2. A stacking tray comprising a circular flat tray bottom, a continuous side wall sloping sideward and upward extending, a horizontal lip extending outward from the upper edge of said side wall, a plurality of depressed identically shaped combination air vents and stacking lugs, having parallel sides formed in said lip and extending downward therefrom to the inner surface of said side wall; each of said identically shaped combination air vents and stacking lugs, having parallel sides extending outward of said side wall so as to form a stacking lug underneath said lip, the bottom of said lugs being flat and terminating above the level of said tray bottom and the side walls of said ports being parallel to each other.

3. A plurality of identical stacking trays forming a set, each of said trays comprising a circular flat tray bottom, a continuous, circular, outward sloping side wall extending upward from said tray bottom, a horizontal lip extending outward from the upper edges of said side wall, a plurality of combination stacking lugs and air passages formed in said lip and extending downward therefrom to the inner surface of said side wall; the walls of said passages extending outward of said side wall so as to form stacking lugs underneath said lip, the bottom surface of said lugs terminating above the level of said tray bottom.

4. A stacking tray comprising a circular flat tray bottom, a continuous side wall extending upward from said bottom, a horizontal lip extending outward from the upper edge of said side wall, a plurality of depressed, identically shaped combination air vents and stacking lugs formed in said lip and extending downward therefrom to the inner surface of said side wall; each of said air vents extending outward of said side wall so as to form a stacking lug underneath said lip, said ports being irregularly spaced about said lip.

References Cited

UNITED STATES PATENTS

| | | | |
|---|---|---|---|
| 2,300,317 | 10/1942 | Scherer | 220—97 X |
| 2,852,157 | 9/1958 | Frater | 220—97 |
| 3,112,841 | 12/1963 | Martinelli | 220—97 X |
| 3,195,770 | 7/1965 | Robertson | 220—23.6 |
| 3,233,812 | 2/1966 | Kennedy | 229—2.5 |
| 3,233,813 | 2/1966 | Wolford | 229—3.5 |

THERON E. CONDON, *Primary Examiner.*

G. E. LOWRANCE, *Assistant Examiner.*